United States Patent [19]

Hergenrother et al.

[11] 4,258,170
[45] Mar. 24, 1981

[54] POLYPHOSPHAZENE POLYMERS CONTAINING PYRAZOLE OR IMIDAZOLE SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 67,985

[22] Filed: Aug. 20, 1979

[51] Int. Cl.$^3$ .............................................. C08G 83/00
[52] U.S. Cl. .................................... 528/168; 528/362; 528/374; 528/392; 528/399
[58] Field of Search .............. 528/168, 392, 399, 362, 528/374

[56] References Cited

U.S. PATENT DOCUMENTS

| | | | |
|---|---|---|---|
| 4,179,553 | 12/1979 | Hergenrother et al. | 528/399 |
| 4,179,556 | 12/1979 | Hergenrother et al. | 528/399 |
| 4,182,837 | 1/1980 | Hergenrother et al. | 528/399 |

Primary Examiner—Wilbert J. Briggs, Sr.

[57] ABSTRACT

Polyphosphazene polymers are prepared which contain repeating units represented by the formulas:

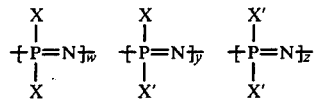

wherein X is represented by one or more of the following structural formulas:

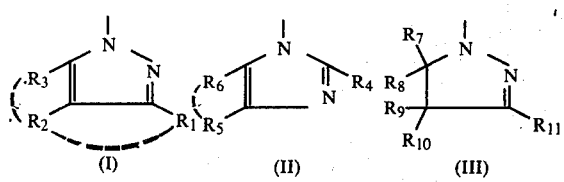

wherein $R_{1-11}$ are independently selected from the group consisting of hydrogen, halogen, cyano, nitro, and substituted and unsubstituted alkyl, aryl, alkoxy, aryloxy, alkylmercapto, and dialkylamino radicals, and $R_{1\ or\ 3}$ and $R_2$, or $R_5$ and $R_6$ taken together can form a substituted or unsubstituted benzene ring structure; X' can represent one or more substituents from the group consisting of a halogen radical, substituted and unsubstituted alkoxy, aryloxy, amino and mercapto radicals which are known in the state of the art in poly(phosphazene) technology and which are compatible with the copolymer substituents. The polymer can contain from 20 to 50,000 of such units such that $20 \leq (w+y+z) \leq 50,000$.

The polymers of the invention can be utilized to form protective films and can also be utilized in applications such as for molding, coatings, foams, and the like.

19 Claims, No Drawings

POLYPHOSPHAZENE POLYMERS CONTAINING PYRAZOLE OR IMIDAZOLE SUBSTITUENTS

BACKGROUND OF THE INVENTION

Polyphosphazene polymers containing repeating

units in which various unsubstituted and substituted alkoxy, aryloxy, amino and mercapto groups are attached to the phosphorus atom and their method of preparation are described in the prior art as illustrated in the publication, "Phosphorus-Nitrogen Compounds," Academic Press, New York, New York, 1972, by H. R. Allcock and "Poly(Organophosphazenes)", Chemtech, Sept. 19, 1975, by H. R. Allcock and in such U.S. Pat. Nos. as 3,515,688; 3,702,833; 3,856,712; 3,974,242; and 4,042,561 which are hereby incorporated by reference.

However, none of the aforementioned publications or patents or for that matter none of the prior art of which the applicants are aware, discloses or suggests polyphosphazene copolymers containing pyrazole or imidazole substituents or to method of preparing such polymers.

SUMMARY OF THE INVENTION

This invention relates to polyphosphazene copolymers containing repeating

units in the polymer chain in which up to 60 percent of the possible substitution sites are substituted with substituted or unsubstituted pyrazole or imidazole substituents. More particularly, the invention relates to polyphosphazene polymers having substituents, which are derived from pyrazoles and imidazoles, which are attached to the phosphorus atom by a nitrogen atom which is not in the polyphosphazene chain and to a method of preparing such polymers. Any other substituent groups, such as as alkoxy, aryloxy, amino and mercapto groups which are compatible with the pyrazole and imidazole substituents and are known in the polyphosphazene state of the art may be substituted onto the polyphosphazene in addition to the pyrazole and imidazole substituents. These optional substituents may be substituted onto the polyphosphazene by the method disclosed in the present invention or by prior art methods.

DETAILED DESCRIPTION OF THE INVENTION

The polymers of the invention contain repeating units represented by the formulas:

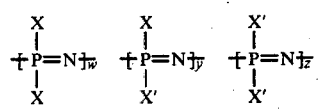

wherein X is represented by one or more of the following structural formulas:

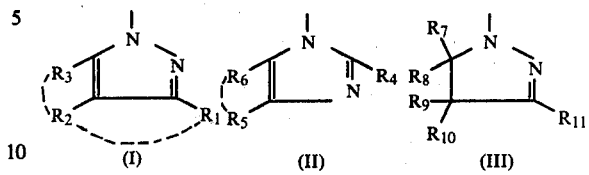

wherein $R_{1-11}$ are independently selected from the group consisting of hydrogen, halogen, cyano, nitro, alkyl, aryl, alkoxy, aryloxy, alkylmercapto, and dialkylamino radicals, and $R_1$ or $_3$ and $R_2$, or $R_5$ and $R_6$ taken together can form a substituted or unsubstituted benzene ring structure; X' can represent one or more substituents from the group consisting of halogen radical, substituted and unsubstituted alkoxy, aryloxy, amino and mercapto radicals which are known in the state of the art in poly(phosphazene) technology and which are compatible with the copolymer substituents. The polymer can contain from 20 to 50,000 of such units such that $20 \leq (w+y+z) \leq 50,000$. The various substituted groups, $R_{1-11}$ and X', can be substituted themselves with any "non-reactive" substitutent, i.e., a substituent which is non-reactive with the various materials present during polymer formation. Suitable "non-reactive" substituents include chloro, bromo, nitro, cyano, alkyl, aryl, aryloxy, alkoxy and the like.

For the purposes of this invention in both the specification and the claims, substituents, with and without further substitutions, derived from $\Delta^2$-pyrazoline (formula III, $R_{7-10}=H$), 1-H-indazole (formula I, $R_1=H$, $R_2$ and $R_3$ are linked to form benzene ring), and 2-H-indazole (formula I, $R_3=H$, $R_1$ and $R_2$ are linked to form benzene ring) are considered to be substituted pyrazoles. Also, substituents, with and without further substitutions, derived from benzimidazole (formula II, $R_4=H$, $R_5$ and $R_6$ are linked to form a benzene ring) are considered to be substituted imidazoles.

One skilled in the art readily will recognize that steric hindrance will dictate the propriety of using relative bulky groups in the 5-position on the pyrazole ring or in 2- or 5-positions on the imidazole ring, since, as set forth hereinafter, the polymers of the present invention are made by reaction the hydrogen on the 1-position nitrogen in the pyrazole or imidazole ring with a chlorine atom on a phosphorus atom in a poly(chlorophosphazene) backbone. Desirably, groups which sterically hinder this reaction should be avoided. With the foregoing proviso in mind, the selection of the various substitution groups which can be present on the pyrazole or imidazole ring will be apparent to one skilled in the art.

In the polymer units represented by the above formulas, all X substituent groups can be the same or they can be mixed and all X' substituent groups can be the same or mixtures of halo, alkoxy, aryloxy, amino and mercapto groups.

The phosphazene polymers of the invention can be represented by the formula:

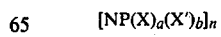

wherein n is from 20 to 50,000 and $a+b=2$, and a and b are greater than zero.

The specific proportion of X to X' substituent groups incorporated in the copolymers of the invention can vary considerably depending upon chemical and physical properties desired in the copolymer and the particular end use application for which the copolymer is intended. Thus, for applications such as moldings, coatings, foams, and the like, the copolymer should contain at least 10 mole percent, by weight, and preferably 25 mole percent, by weight, of the pyrazole or imidazole substituent. The copolymer should preferably contain at most 60 mole percent of pyrazole or imidazole substituents due to the steric hindrance resulting from their bulkiness.

Where the presence of crosslinking functionality is desired, in a polymer otherwise free of unsaturated crosslinking functionality crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. No. 4,055,520; 4,061,606; 4,083,824; 4,083,825; and 4,076,658 which are hereby incorporated by reference and include —OCH=CH$_2$ and —OR$_3$CF=CF$_2$ as well as similar groups which contain unsaturation. Generally, when present, the moieties containing crosslinking functionality are usefully present in an amount between about 0.1 mole percent and to about 50 mole percent and usually between about 0.5 mole percent to about 10 mole percent based on the replaceable chlorine in the starting poly(dichlorophosphazene). These crosslinking moieties are considered to fall within the scope of the term substituted alkoxy substituents as used in the claims.

The polymers can be used to prepare protective films and can be utilized in applications such as moldings, foams, coatings, and the like. Furthermore, the polymers can be used to form metal complexes or as binding sites for other acid group containing polymers.

METHOD OF PREPARATION

The polymers are prepared by reacting a poly(dichlorophosphazene) having the formula -(-NPCl$_2$)$_n$-, in which n is from 20 to 50,000, in the presence of a tertiary amine with either a pyrazole and/or an imidazole, or a mixture of pyrazoles and/or imidazoles, with one or more additional compounds which are reactive with the poly(dichlorophosphazene) to form a copolymer having at least two different substitution groups on the backbone of the polyphosphazene. Examples of the additional compounds used to form copolymers are illustrated in the section entitled "Additional Reactive Compounds", below.

I. The Poly(dichlorophosphazene) Polymer

Poly(dichlorophosphazene) polymers which are employed as starting materials in the process of this invention are well known in the art as illustrated in U.S. Pat. Nos. 3,370,020; 4,005,171; and 4,055,520; and the aforementioned publications of H. R. Allcock, the disclosures of which are incorporated herein by reference.

These polymers have the general formula —(NPCl$_2$-)$_n$— in which n may range from 20 to 50,000 or more. As described in the aforementioned references, the polymers are in general prepared by the thermal polymerization of cyclic oligomers having the formula (NPCl$_2$)$_m$, in which m is an integer from 3 to 7, with the cyclic trimer and tetramer often comprising up to 90 percent of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperature can range from 130° C. to about 300° C., pressures can range from a vacuum of less than about $10^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. The Pyrazole and Imidazole Compounds Useful in Forming the Polymers of the Invention The pyrazole and imidazole compounds which can be employed in producing the polymers of the present invention have no substitutions on the 1-position nitrogen atom other than hydrogen and are represented by the following structural formula:

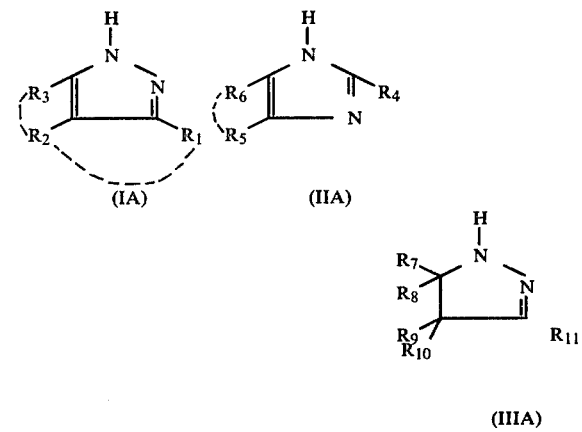

wherein R$_{1-11}$ are independently selected from the group consisting of hydrogen, halogen, cyano, nitro, and substituted and unsubstituted alkyl, aryl, alkoxy, aryloxy, alkylmercapto, and dialkylamino; and R$_1$ $_{or\ 3}$ and R$_2$, or R$_5$ and R$_6$ taken together can form a benzene ring structure. The various substituted groups, R$_{1-11}$, can be substituted with any "non-reactive" substituent, i.e., a substituent which is non-reactive with the various materials present during polymer formation. Suitable "non-reactive" substituents include chloro, bromo, nitro, cyano, alkyl, aryl, aryloxy, alkoxy and the like.

It is preferred that when no benzene ring is fused to the heterocyclic radical, that R$_1$ and R$_2$ are hydrogen or R$_4$ and R$_5$ are hydrogen or R$_{8-11}$ are hydrogen. When a benzene ring is fused to the heterocyclic radical, it is preferred that the remaining substituents on the heterocyclic di-nitrogen containing ring are hydrogen.

Illustrative examples of pyrazoles as illustrated by formula IA which can be suitably employed in the present invention include: pyrazole, 3-methyl-pyrazole, 3-phenylpyrazole, 3-methoxypyrazole, 3-phenoxypyrazole, 3-methyl-4-nitropyrazole, 4-cyanopyrazole, 4-chloropyrazole, 4-bromopyrazole, 3,4-dimethylpyrazole, 3,5-dimethylpyrazole, 3,4,5-trimethylpyrazole, 3,5-diethylpyrazole, 3,4,5-trichloropyrazole, 3,4,5-tribromopyrazole, 3-methyl-4-cyano-5-ethylpyrazole, 5-chloro-3-methyl-pyrazole, 3-trichloromethylpyrazole, 4,5-dichloro-3-trichloromethylpyrazole, 4-bromo-3,5-dimethylpyrazole, 4-bromo-3-methylpyrazole.

Illustrative examples of partially saturated pyrazoles as illustrative by formula IIIA which can be suitably employed in the present invention include: $\Delta^2$-pyrazoline; 4,5-dichloro-$\Delta^2$-pyrazoline; 4,5-dimethyl-$\Delta^2$-pyrazoline; 4-phenyl-$\Delta^2$-pyrazoline; 4-methoxy-$\Delta^2$-pyrazoline; 4-ethyl-5-chloro-$\Delta^2$-pyrazoline; 4,5-diethyl-$\Delta^2$-pyrazoline; 4,4,5,5-tetrachloro-$\Delta^2$-pyrazoline; 4-trichloromethyl-$\Delta^2$-pyrazoline and the like.

Illustrative examples of pyrazole compounds having a benzene ring fused as illustrative by formula IA thereto which can be suitably employed to prepare the polymers of the present invention include: 1-H-indazole; 2-H-indazole; 1-H-4-chloro-indazole; 1-H-4,5,6,7-tetrachloro-indazole; 1-H-3-methyl-indazole; 2-H-4-chloro-indazole; 2-H-4,5,6,7-tetrachloro-indazole; 2-H-3-methoxy-indazole; 2-H-5-methyl-indazole and the like.

Illustrative examples of imidazoles as illustrated by formula IIA which can be suitably employed in the present invention include: imidazole; 2-methylimidazole; 2-ethyl-4-methylimidazole; 2-cyclohexyl-4-methylimidazole; 4-t-butyl-5-ethylimidazole; 2-butoxy-4-cyclopropylimidazole; 2-octyl-4-hexylimidazole; 2-methyl-5-ethylimidazole; 2-ethyl-4-phenylimidazole; 2-ethyl-4-dimethylaminoimidazole; 2-methyl-4-ethylmercaptoimidazole; 2-butyl-4-bromo-5-methylimidazole; 2,5-dichloro-4-ethyl-imidazole; benzimidazole; 4,5,6,7-tetrachlorobenzimidazole; 5-methoxy-benzimidazole; 5,6-dicyano-benzimidazole; 2-chloro-benzimidazole; 2-methyl-benzimidazole; and the like.

The preferred compounds for use in the preparation of the polymers of the present invention are pyrazole, imidazole, 2-H-indazole and benzimidazole.

III. Additional Reactive Compounds

As indicated heretofore, the polyphosphazene copolymers of the invention in addition to the pyrazole or imidazole substituent groups contain at least 40 mole percent of at least one substituent from the group consisting of halo, such as chloro or bromo, substituted or unsubstituted alkoxy, aryloxy, amino or mercapto radicals or mixtures thereof.

Preferred substituent groups represented by X' for use in these compolymers are:

Alkoxy groups (substituted or unsubstituted) derived from aliphatic alcohols having from 1 to 20 carbon atoms such as methanol, ethanol, propanol, isopropanol, n-butanol, sec-butanol, hexanol, dodecanol, and the like; fluoroalcohols, especially those represented by the formula $Z(CF_2)_nCH_2OH$ in which Z is hydrogen or fluorine and n is an integer from 1 to 10 as illustrated by trifluoroethanol; 2,2,3,3-pentafluoropropanol; 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the compolymer, mixtures of the foregoing alcohols can be employed.

Aryloxy groups (substituted or unsubstituted) derived from aromatic alcohols including among others phenol; alkyl-phenols such as cresols, xylenols, p-, o-, and m-ethyl and propyl phenols and the like; halogen-substituted phenols such as p-, o-, and m-chloro and bromophenols and di- or tri-halogen substituted phenols and the like; and alkoxy-substituted phenols such as 4-methoxyphenol; 4-(n-butoxy)phenol and the like.

Amino groups derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al (hereby incorporated by reference) may be utilized. Representative of suitable mercaptan compounds as described in the aforementioned patents are methyl mercaptan and its homologs, ethyl, propyl, butyl, aryl and hexyl mercaptan, thiophenol, thionapthanols, benzyl mercaptan, cyclohexyl mercaptan and the like.

IV. The Tertiary Amine

The use of tertiary amines in preparing the polymers of the invention minimizes undesirable side reactions and at the same time acts as an effective acid scavenger.

Tertiary amines which can be employed in preparing the polymers of the invention are those represented by the general structure:

wherein $R_1$, $R_2$ and $R_3$ can each be alkyl containing from 1 to 8 carbon atoms. Thus, for example, the tertiary amine can be a trialkyl amine such as trimethyamine, triethylamine, triisopropylamine, tri-n-propylamine, tri-isobutylamine, tri-n-butylamine, and the like. In addition tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine; N-methyl morpholine; n-methyl pyrrole; 1,4-diaza-bicyclo(2.2.2)octane (DABCO) and dipiperidyl ethane.

As indicated above, the polymers of the present invention are prepared by reacting the poly(dichlorophosphazene) polymer and the pyrazole/imidazole in the presence of a tertiary amine. Any of the compounds listed in the group of "Additional Reactive Compounds," which can be substituted onto the poly(dichlorophosphazene) in the presence of a tertiary amine can also be employed in the reaction mix.

The specific reaction conditions and proportion of ingredients employed in preparing these polymers can vary somewhat depending on factors such as the reactivity of specific pyrazole or imidazole compound utilized, the particular tertiary amine employed, and degree of substitution desired in the finished polymer. In general, reaction temperatures can range from about 25° C. to about 200° C. and times can range from 3 hours up to 7 days; lower temperatures necessitating longer reaction times and higher temperatures allowing shorter reaction times. These conditions are, of course, utilized in order to obtain the most complete reaction possible, i.e., in order to insure the substantial conversion of the chlorine atom in the polymer to the corresponding substituted pyrazole or imidazole compounds and form a substantially hydrolytically stable polymer.

The above reaction is ordinarily carried out in the presence of a solvent. The solvent employed in the reaction should be a solvent for the poly(dichlorophosphazene) polymer, the pyrazole or imidazole and the tertiary amine. Examples of suitable solvents which may be employed include diglyme, triglyme, tetraglyme, cyclohexane, chloroform, dioxane, dioxolane, methylene chloride, toluene, xylene, and tetrahydrofuran. The amount of solvent is not critical and any amount sufficient to solubilize the reaction mixture materials can be employed. In addition the materials in the reaction zone should be reasonably free of water. The prevention of substantial amounts of water in the reaction system is necessary in order to inhibit the undesirable side reaction of the available chlorine atoms in the chloropolymer. Preferably, the reaction mixture should contain less than about 0.01 percent water.

In general, the amount of pyrazole/imidazole and the other compounds which are substitutionally reactive with poly(dichlorophosphazene) employed in the process should be at least molecularly equivalent to the number of available chlorine atoms in the starting polymer. However, if desired, an excess of such compounds may be employed in order to insure substantially complete reaction of all the available chlorine atoms.

While the pyrazole and imidazole substituted poly(phosphazene) polymers and copolymers of the present invention have been prepared in the above-identified manner, that is, in the presence of a tertiary amine, alternative methods of preparation are available for preparation of the copolymer.

The prior art methods of poly(dichlorophosphazene) substitution such as by reaction with sodium alkoxide as demonstrated in U.S. Pat. No. 3,370,020 to Allcock et al cannot be used to prepare the phosphazene polymers of the present invention.

The prior art methods may be used to substitute the poly(dichlorophosphazene) with the substituents derived from the compounds listed in the list of additional reactive compounds after the poly(dichlorophosphazene) has been partially substituted with pyrazole or imidazole groups using the tertiary amine substitution process.

The following example is submitted for the purpose of further illustrating the nature of the present invention and are not intended as a limitation on the scope thereof. Parts and percentages referred to in the example and throughout the specification are by weight unless otherwise indicated. All temperatures are degrees of Centigrade unless otherwise specified.

EXAMPLE 1

A 10-ounce bottle was charged with 3.00 gms (44 millimoles) of pyrazole, 100 cc of tetrahydrofuran (hereinafter THF), 12.3 cc (88 millimoles) of triethylamine, 3.2 cc (44 millimoles) of trifluoroethanol and 57.2 gms (39.5 millimoles of a 8.0% THF solution of poly(dichlorophosphazene). The bottle and its charge were heated for 64 hours in a 70° C. bath whereupon a salt layer was formed in the reaction solution. The reaction solution was subjected to Infrared spectroscopy and the loss of the P-Cl band at 600 cm$^{-1}$ was undeterminable as strong new bands were formed at 611 cm$^{-1}$, 587 cm$^{-1}$, and 522 cm$^{-1}$.

Methanol washing of the salt layer of the reaction mixture yielded 1.33 gms of a white rubbery polymer while the remainder of the reaction mixture was coagulated in hexene to produce 6.2 gms of a white rubbery polymer which had a $T_g$ of 36° C. and a $T_m$ of 109° C.

EXAMPLE 2

A 10-ounce bottle was charged with 3.00 gms (44 millimoles) of imidazole, 100 cc of THF, 12.3 cc (88 millimoles) of triethylamine, 4.43 cc (44 millimoles) of p-chlorophenol, and 33.15 gms (40.1 millimoles) of a 14% cyclohexane solution of poly(dichlorophosphazene). The reaction mix rapidly which became opaque and slightly exothermic was then heated for 20 hours at 120° C. after which a large light yellow precipitate was formed. 4.43 cc (44 millimoles) of p-chlorophenol was added to the solution and precipitate which was then heated for an additional 20 hours at 120° C. after which it was filtered and water washed to yield 7.00 gms of a white powder. The white powder was pressed at 110° C. to form a clear colorless film which when it was subjected to I.R. analysis showed the loss of the P-Cl band at 600 cm$^{-1}$.

EXAMPLE 3

A 10-ounce bottle was charged with 3.00 gms (44 millimoles) of imidazole, 100 cc of THF, 12.3 cc (88 millimoles) of triethylamine, 3.2 cc (44 millimoles) of trifluoroethanol, and 40 gms (40 millimoles) of an 11.6% THF solution of poly(dichlorophosphazene). The bottle and its contents were heated for 68 hours at 120° C. Upon cooling and I.R. analysis of the reaction mixture showed the total loss of the P-Cl band at 600 cm$^{-1}$ and the formation of new peaks at 565 cm$^{-1}$ and 5.19 cm$^{-1}$. The reaction mixture was coagulated in methanol to yield 1.85 gms of a cream-colored rubbery polymer having a $T_g$ of −98° C. and a $T_m$ of 116° C.

We claim:

1. A polyphosphazene copolymer containing units represented by the formulas:

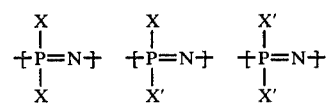

wherein X is represented by one or more of the following structural formulas:

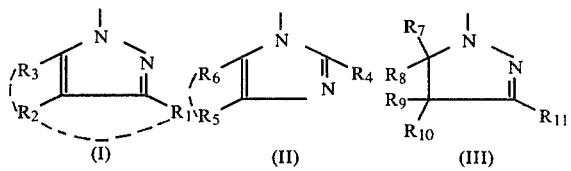

wherein R$_{1-11}$ are independently selected from the group consisting of hydrogen, halogen, cyano, nitro, and substituted and unsubstituted alkyl, aryl, alkoxy, aryloxy, alkylmercapto, and dialkylamino radicals, and R$_1$ $_{or}$ $_3$ and R$_2$, and R$_5$ and R$_6$ taken together can form a substituted or unsubstituted benzene ring structure; X' can represent one or more substituents from the group consisting of a halogen radical, substituted and unsubstituted alkoxy, aryloxy, amino and mercapto radicals.

2. The copolymer of claim 1 in which the units of the polyphosphazene copolymer are randomly distributed.

3. The copolymer of claim 1 in which X is derived from pyrazole.

4. The copolymer of claim 1 in which X is derived from imidazole.

5. The copolymer of claim 1 in which X is derived from $\Delta^2$-pyrazoline.

6. The copolymer of claim 1 in which X is derived from 1-H-indazole.

7. The copolymer of claim 1 in which X is derived from 2-H-indazole.

8. The copolymer of claim 1 in which X is derived from benzimidazole.

9. The copolymer of claim 1 in which X' is —OCH$_2$CF$_3$.

10. The copolymer of claim 1 in which X' is —OC$_6$H$_4$—p—Cl.

11. A method of preparing polyphosphazene copolymers containing units represented by the formulas:

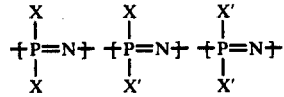

wherein X is represented by one or more of the following structural formulas:

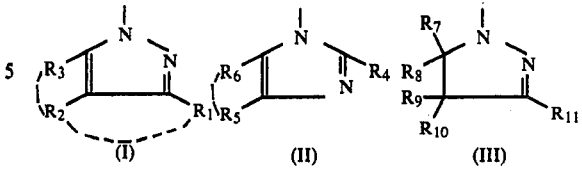

wherein R$_{1-11}$ are independently selected from the group consisting of hydrogen, halogen, cyano, nitro, and substituted and unsubstituted alkyl, aryl, alkoxy, aryloxy, alkylmercapto and dialkylamino radicals, and R$_{1\,or\,3}$ and R$_2$, or R$_5$ and R$_6$ taken together can form a substituted or unsubstituted benzene ring structure; X' can represent one or more substituents from the group consisting of a halogen radical, substituted and unsubstituted alkoxy, aryloxyy, amino and mercapto radicals; said method comprising reacting a poly(dichlorophosphazene) polymer having the formula —(NPCl$_2$)$_n$—, wherein n is from 20 to 50,000 with one or more heterocyclic compounds selected from the group consisting of unsubtituted and substituted pyrazole and imidazole and one or more additional compounds selected from the group consisting of a substituted or unsubstituted alkanol, aromatic alcohol, amine and mercaptan in the presence of a tertiary amine.

12. A method of claim 11 in which the heterocyclic compound is pyrazole.

13. A method of claim 11 in which the heterocyclic compound is imidazole.

14. The method of claim 11 in which the heterocyclic compound is $\Delta^2$-pyrazoline.

15. The method of claim 11 in which the heterocyclic compound is 1-H-indazole.

16. The method of claim 11 in which the heterocyclic compound is 2-H-indazole

17. The method of claim 11 in which the heterocyclic compound is benzimidazole.

18. The method of claim 11 in which the additional compound is selected from the group consisting of trifluoroethanol, p-chlorophenol and mixtures thereof.

19. The method of claim 11 in which the tertiary amine is triethylamine.

* * * * *